United States Patent [19]

Sauter

[11] Patent Number: 5,537,546
[45] Date of Patent: Jul. 16, 1996

[54] HIGH-LEVEL ADAPTABLE BIDIRECTIONAL PROTOCOL FOR USE BETWEEN A HYPERMEDIA SYSTEM AND A PLURALITY OF EDITORS

[75] Inventor: Louis Sauter, Longjumeau, France

[73] Assignee: Bull S.A., Paris, France

[21] Appl. No.: 546,623

[22] Filed: Oct. 23, 1995

Related U.S. Application Data

[63] Continuation of Ser. No. 44,588, Apr. 7, 1993, abandoned.

[30] Foreign Application Priority Data

Apr. 17, 1992 [FR] France ..................................... 92 04803

[51] Int. Cl.⁶ .............................. G06F 17/24; G06F 13/00
[52] U.S. Cl. ..................... 395/200.01; 395/153; 395/154; 395/200.04
[58] Field of Search ..................................... 395/153, 154, 395/200.01, 200.04

[56] References Cited

U.S. PATENT DOCUMENTS

| | | | |
|---|---|---|---|
| 5,107,443 | 4/1992 | Smith et al. ............................ | 395/158 |
| 5,220,657 | 6/1993 | Bly et al. ................................ | 395/425 |
| 5,293,619 | 3/1994 | Dean ....................................... | 395/650 |
| 5,339,388 | 8/1994 | Bates et al. ............................. | 395/148 |
| 5,355,472 | 10/1994 | Lewis ..................................... | 395/700 |
| 5,392,400 | 2/1995 | Berkowitz et al. ..................... | 395/700 |

FOREIGN PATENT DOCUMENTS 0451281  10/1991  European Pat. Off. .

OTHER PUBLICATIONS

"Multimedia Databases: A Formal Framework", Yoshifumi Masunaga, IEEE Computer Society Office Automation Symposium, Apr. 1987, pp. 36–45, Gaithersburg, Maryland, U.S.A.

*Primary Examiner*—Richard L. Ellis
*Attorney, Agent, or Firm*—Weingarten, Schurgin, Gagnebin & Hayes

[57] ABSTRACT

A very high-level bidirectional protocol (CP) used for communication between a hypermedia system (HS) and a large number of interconnected editors (HSE, Ea, Eb, Ec, . . . ) communicating within a hyperstructure. This protocol (CP) uses a set of messages that allow each editor to manipulate and manage the contents of hypermedia objects called nodes, and it is also manipulated by the hypermedia objects and is accessible through a programming interface.

7 Claims, 1 Drawing Sheet

HIGH-LEVEL ADAPTABLE BIDIRECTIONAL PROTOCOL FOR USE BETWEEN A HYPERMEDIA SYSTEM AND A PLURALITY OF EDITORS

This application is a continuation of application Ser. No. 08/044,588, filed Apr. 7, 1993, now abandoned.

FIELD OF THE INVENTION

This invention concerns the use of a communications protocol between a hypermedia system and a large number of interconnected editors communicating within a hyperstructure.

BACKGROUND OF THE INVENTION

A hypermedia system should be organized so as to make it possible to link together a large number of multimedia documents and let a system user move or navigate from any one document to another out of any predetermined order.

Until now, the communications protocols used in such environments were low-level protocols, which did allow communication between various applications, but required long, complex programming when there was a need, inter alia, to increase the number of functions in the editor programs which communicate within a hyperstructure or even to allow an editor to be integrated into a distributed environment. Thus, in a UNIX environment (trademark of UNIX System Laboratories, Inc.), an RPC-type protocol ("Remote Procedure Call") is used, which is a low-level protocol. Similarly on PCs operating in a hypermedia environment under "Windows", for example with "Toolbook", a low-level protocol called DDE ("Dynamic Data Exchange" by Microsoft) is used. Currently, to promote editor communication and management, parts of programs have to be added to such protocols in such a way as to suggest a higher-level use, allowing several editors to be managed effectively and simply. Indeed, the protocols used today are not specifically oriented toward editors and, consequently, cannot easily authorize the addition of other functions to said editors or the integration of other editors into an existing environment. On the contrary, the current protocols can only add editors or integrate them into a hypermedia environment on the strict condition that an extremely long time is devoted to them, which can be measured in months, or even years.

SUMMARY OF THE INVENTION

The purpose of this invention is to remedy the disadvantages inherent in the use of low-level protocols of the prior art and to propose a communications protocol which makes it possible to encourage the development of interactive multimedia applications while avoiding the programming difficulties linked to such developments.

To do so, a very high-level bidirectional protocol is used for communication between a hypermedia system and a large number of interconnected editors communicating within a hyperstructure. This protocol uses a set of messages that lets each editor manipulate and manage the contents of hypermedia objects called nodes while said protocol is manipulated by the hypermedia objects and is accessible through a programming interface. Thus, the communications protocol of the invention, because of its very high level, makes it easy to manage a large number of editors, and hence applications communicating within a hyperstructure, to add hypermedia functions and to integrate new editors into the existing hyperstructure in an extremely short time.

The applications that communicate, like those that are created within this hyperstructure, can also advantageously present any information using text, graphics, animation, audio and video.

This protocol is also bidirectional, which means that functionally a dialogue is established and messages can go back and forth between an editor and the hypermedia system. Thus, some requests can be addressed by the hypermedia system to the editors, just as some messages can be sent from the editors to the hypermedia system. Generally speaking, the hypermedia system allows collections of active multimedia documents to be compiled and linked together. Each multimedia document is combined with a hypermedia object called a node. In this case, the hypermedia system itself is not what manipulates the contents of these nodes; indeed, communication with the different editors operating independently is organized by the communications protocol, which uses a set of messages in such a way that it facilitates the development of interactive multimedia applications, while eliminating the long, complex programming problems usually encountered with protocols of the prior art. The protocol is accessible through a programming interface that facilitates dialogue with the different editors, tools or applications for creating, deleting and manipulating hypermedia objects.

Remarkably, the protocol used is based on the principle of a transmission management program like TCP/IP (Transmission Control Protocol/Internet Protocol).

BRIEF DESCRIPTION OF THE DRAWING

These and other objects, features and advantages of the present invention will become apparent upon reference to the following detail description of the preferred embodiments and the drawing, wherein.

DETAILED DESCRIPTION OF THE INVENTION

Figure 1:
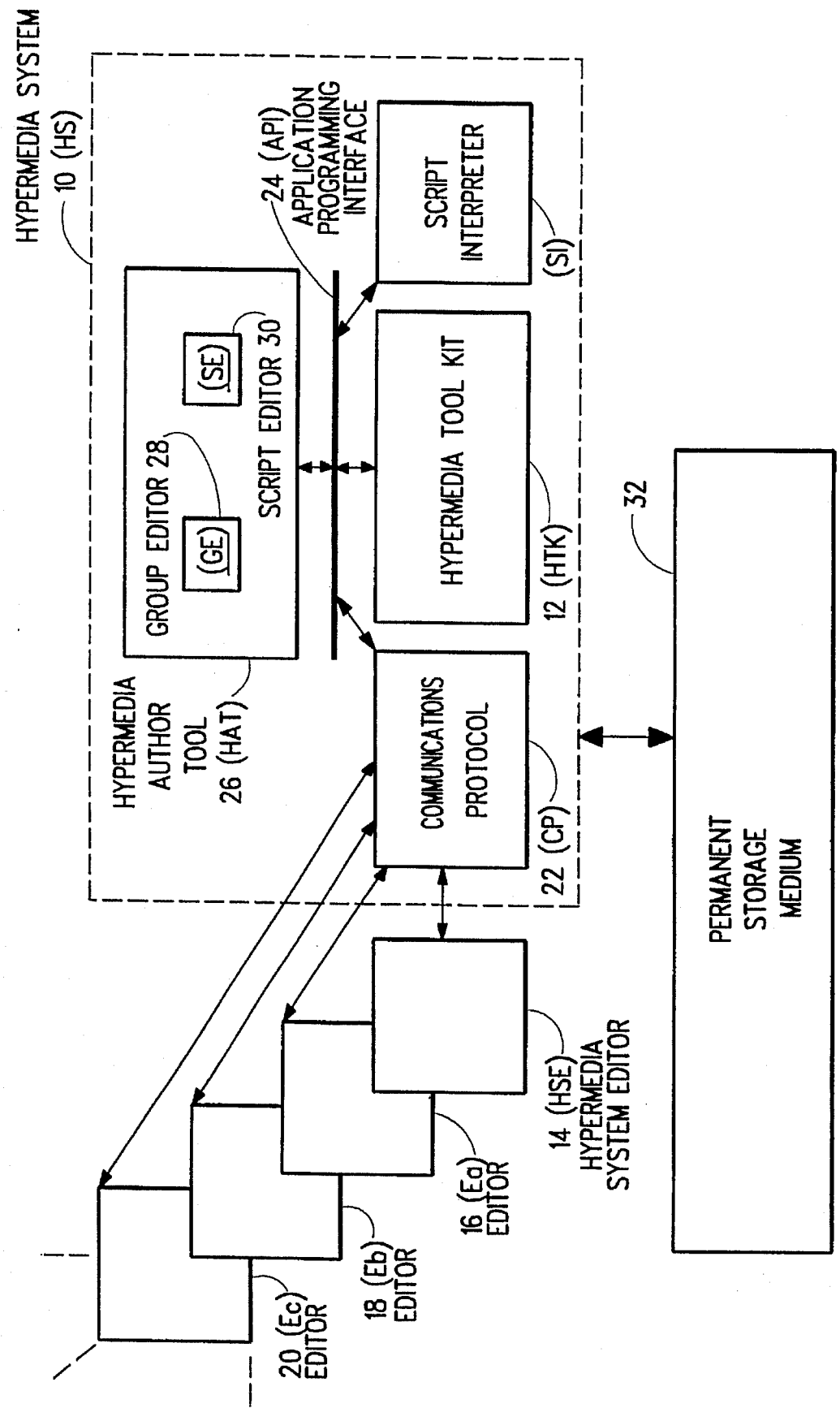
FIG. 1 is a block diagram illustrating one embodiment of an architecture that shows a hypermedia system communicating with a large number of editors.

A hypermedia system makes it possible to create interactive multimedia applications, which consist of producing multimedia documents and connecting them. These multimedia documents can be obtained through the use, for example, of drawing programs, audio or video tools, etc.. To be managed simply but effectively, the most complex applications can also require that small, simple programs usually called "scripts" be designed to allow hypermedia objects to be modified or set in motion. In this way, the applications developed in this hypermedia environment can be used to the fullest and the user need not have in-depth knowledge of the system.

Referring to FIG. 1, the hypermedia system 10 (hereinafter "HS") is composed of several components. A hypermedia unit called "toolbox" 12 (hereinafter "HTK") gives those who develop the applications the means of creating and manipulating permanent distributed hypermedia objects, such as nodes, groups, anchors and links whose definitions are listed below. These objects can be written in C++, a programming language, and are then accessible either in C++ or through a programming interface written in C.

In order to provide a better understanding of the object of the invention, brief definitions of the different hypermedia objects are given below.

A hypermedia document is actually a set of interconnected multimedia documents. Each multimedia document is called a "node." In the hypermedia system HS 10 which is being described here, there is a difference between the structure of a node (which manages the links, the scripts, etc . . . ) and the multimedia contents of a node. The HS 10 itself manages the structure of the node, while the contents of the nodes are managed and manipulated by the different editors HSE 14, Ea 16, Eb 18, Ec 20, . . . The communications protocol 22 (hereinafter "CP") between the editors and the HS 10 makes it possible conveniently to open or close documents, find parts of the contents, etc..

The "anchor" is another hypermedia entity used. It is a sensitive part, also called a sensitive zone, of the contents of a node. For example, an anchor can represent a word in a text or a predefined area in an image, where the word or zone reacts when the user interacts with it, for example, with a mouse, keyboard or some other way.

The "group" is a third hypermedia entity which makes it possible to build a logic collection of nodes. Several groups can be nested, just as one group can contain several others not necessarily nested. On the other hand, a node or a group can only belong to one group at a time.

In the hypermedia system, a "link" can serve as a communications channel between several hypermedia objects (anchors, nodes or groups). Thus, different messages can be sent via a link, for example, an activation message will have the effect of opening and matching a target object to an existing object.

Nodes, anchors and groups can each have an associated "script." This script describes the way in which the object should react when various events or messages appear. The scripts are written in a specific event-oriented language (hereinafter "MT"). This MT language authorizes an "author" or a user to run some simple applications or applications defining actions to be carried out on the hypermedia objects concerned in response to different messages. These scripts are interpreted by the script interpreter SI.

As explained above, the communications protocol CP 22 has a set of messages and has been advantageously defined to make it possible for different editors (HSE 14, Ea 16, Eb 18, Ec 20, . . . ) to manage the contents of the nodes. The CP 22 is directly manipulated by the hypermedia objects and is accessible through a programming interface 24 (hereinafter "API").

The HS 10 also includes a hypermedia author tool 26 (hereinafter "HAT"), which is a written application of X/Motif of the OSF (Open Software Foundation) using the toolbox HTK 12. The HAT 26 makes it possible, on one hand, for a reader to scroll through a existing hyperdocument on a screen and, on the other hand, for an author to create a new hypermedia application or change an existing hypermedia application. The authors can create groups, nodes, anchors and links, edit the contents of the nodes using an editor (HSE 14, Ea 16, Eb 18, Ec 20, . . . ) that conforms to the communications protocol CP 22 and potentially write scripts in the language MT. Some more complex applications can be run via external functions and can be called up using the language MT. The HAT 26 also includes a group editor 28 (hereinafter "GE") and a script editor SE 30 (hereinafter "SE").

The editors (HSE 14, Ea 16, Eb 18, Ec 20, . . . ) that conform to the protocol CP 22 are used to manage the contents or part of the contents of the nodes. When a new node is created, the editor that should be used to manage the contents of the node is specified; that editor will then be used systematically each time that the node is displayed. The HSE 14 is specifically an X/Motif multimedia editor developed for the hypermedia system 10. A large number of other editors (Ea 16, Eb 18, Ec 20, . . . ) has been expanded to manipulate the communications protocol 22.

The hypermedia objects and the documents manipulated by the HSE 14 are stored in a permanent storage medium PSP 32.

The editors can offer several levels of support for the protocol CP 22; the minimal support consists of processing two requests (opening and closing a node) and sending error messages for all the other requests.

Each structure in the hypermedia node, manipulated by the tool HTK 12, contains the name of the editor that should be used to edit the corresponding document.

The HS 10 does not define the user interface for the editors. The editors are free to use any style of presentation. The format in which the contents are stored depends on the editor. The HS 10 suggests the access path to the directory in which the document can be stored. This path is sent to the editor each time that the document is opened. A number of extensions to the protocol have been pre-organized, but some user-defined extensions are also possible.

The interactive multimedia applications developed by using the hypermedia system 10 make it possible, for example, to start some actions by clicking the mouse on a predefined part of an image. Thus, on a document containing an image that represents a face, clicking the mouse near the mouth could trigger a voice message. A succinct analysis of this operation could be made as follows: the editor detects the mouse clicking on a predefined area of the image; it sends the information on the mouse click to the proper hypermedia object; and the HS 10 manages the event by executing the script for this hypermedia object, which, in this example, has the effect of triggering a voice message.

The parts of documents that allow actions to be triggered are called sensitive zones. The anchor is the hypermedia object associated with a sensitive zone. When an event (clicking the mouse, striking a key on the keyboard, etc. . . ) occurs in a sensitive zone, information is sent to the anchor concerned. The HS 10 manages the semantics (links, scripts, . . . ) associated with the anchors.

Each anchor has a unique identifier signified by the HS 10 when the anchor is created. This identifier serves as a label later on and is stored by the editor along with the other properties related to the sensitive zone concerned.

The identifier of a node is a pointer in a structure containing the sole identifier of the node concerned.

The editors can manage different types of sensitive zones: a zone on an image, a part of a text, any graphic object in a drawing program (including groups of objects), special interaction objects (push button, cursor of an audio potentiometer, . . . ).

The editors can also manage three modes of visual presentation of sensitive zones on an image or in a text: the hidden mode, the display mode and the highlight mode. For example, in the display mode, one word in a text will be surrounded by a rectangle. However, the particular style of presentation will depend on the contents and the editor.

Similarly, the editors should support the author mode and the reader mode. In author mode, the user can edit the contents of a document, select objects, add or delete anchors, etc.. In the reader mode, most of the user's actions are sent in the form of messages from the protocol CP 22 if they appear in one area of an anchor; if not, they are ignored.

The editor communicates in a remarkable way with the hypermedia system according to the protocol, mainly using a set of five types of messages, such as: request messages sent by the hypermedia system when some action should be executed by the editor; response messages, sent by the editors in response to a request message; event messages, sent by the editors to inform the hypermedia system that various events have occurred (for example, the mouse clicking on an anchor); menu messages, sent by the editors to inform the hypermedia system the user has selected a predefined menu (for example, closing a node); and error messages, sent by the editors when an error appears.

These different types of messages will be explained below.

For a given application, at the very beginning, the editor has to initialize the protocol CP 22. To do so, the message must specify the context of the application, the name of the editor, the function the editor offers for manipulating the requests and the maximum number of connections supported by the editor. Once initialized, the protocol will manage the connections and will automatically distribute the requests it receives properly. Similarly, when the processing is finished, the editor will have to send a message closing the protocol before leaving the system.

A request made by the hypermedia system includes two arguments: the request itself and a connection number specific to it. The same connection number and thus the same connection will have to be used for the response and error messages that go with that request. Also, the connection number used when a document is opened will have to be used to send event or menu messages concerning that document.

When an editor receives a request message sent by the hypermedia system, the message is identified by a pointer designating the specific structure of the request which conforms to the protocol CP 22. The response messages to the requests, of course, use some functions that are specific and conform to the protocol CP 22; the responses have to be sent before any other request is read. The different structures that go with the various requests used are described below.

Open node (all editors used in this environment must know how to manage this request): when a document has to be opened, the HS 10 sends this kind of request to the editor, indicating the node identifier, the access path which is suggested, but not required for an existing directory, into which the editor can place the contents of a node; and the name of the node and the mode supported (read only or create). Once the document has been opened, the editor sends a response message to the open node request with a number that will be used in any future request concerning that node. If the document cannot be opened, then the error message is sent.

Close node (all editors used in this environment must know how to manage this request): when such a request is received, the editor has to close the document associated with the node concerned. It can save the document to be closed when that is expressly required; if not, even if it has been modified, it does not save it.

Delete node (the editors used in his environment manage this request optionally): if a node has been deleted, this request is sent when the modifications made to the hypermedia document have been saved. When an open node is deleted, the editor receives only one close node request; if the deletion is confirmed by an express request to save, then a node deletion request is sent. However, if the editor has stored the contents of the node in the directory suggested by the system HS, this request can be ignored: the HS 10 itself deletes this directory with all its contents; if not, the editor has to delete the contents of the node.

Map node (it is desirable for the editor to know how to manage this request, but it is not obligatory if all open nodes are always displayed): when this request is received, the editor must display the corresponding document. If the node is already displayed, this puts it in the foreground.

Unmap mode (management of this request is optional): when the display of a document must be deleted, the system HS sends this request to the editor.

Save node, save all nodes (all editors supporting "anchor" objects have to know how to manage this request): the HS 10 can ask an editor to save the document by sending this request. To maintain consistency between the node contents and the node structure, the editors that manipulate the anchors have to save a node if, and only if, they receive this request. The editors who receive a save all nodes request execute this save for all modified nodes open at the time when the request arrives. In addition, if the property "ignore changes" is attached to a node and this property is confirmed, the editor does not have to save the node unless a change has been made to the anchors in this node. If some anchors were modified or created, the editor then saves the node.

Print node (management of this request is optional): the HS 10 can ask an editor to print the document by sending this request.

Get node property (this request is optional, but if it is not supported by an editor, an error message must be sent): the HS 10 can send this request to find the value of a property in the contents of a node. If the node is found and the property is authorized and run by the editor, the editor sends the value of this property with the related response message; if not, it sends an error message.

Set node property (this request is optional): the HS 10 can send this request to change the value of a property of the contents of the node. If the node is found and the property and the value are correct, the editor sets the value of the property to its new value; if not, the editor sends an error message to the HS 10. A brief description of the various properties will be given below. Note that all these properties are optional and that the editor can ignore this type of request.

Search text (this request is optional, but if it is not supported, an error message must be sent): the editor must search a given chain in the text-type objects in a document, starting with the beginning of the first text-type object. A subsequent request has the effect of searching for the next appearance in the current chain. A mode value specifies various options for the search.

Create anchor (this request must be managed by any editor that supports anchors; support for a request for anchor creation in an object that can be modified is optional): to create a new anchor, the HS 10 sends this request to the editor. The editor must create a sensitive zone. Two parameters, x and y, respectively, give the position at the beginning and end of the sensitive zone for text-type objects. For images, four parameters are used: these two parameters, x and y, plus two parameters that give the width and height of the sensitive zone. For audio and video objects, two extra parameters for the first raster and the last raster define the first and last rasters where the sensitive zone should be active, i.e., the beginning and the end in time. If the request cannot be met, the editor must send an error message to the HTK 12 in the HS 10.

Delete anchor (this request should be managed by any editor that supports anchors): this request is sent by the HS 10 to the editor to delete an anchor. The editor must delete the object associated with the anchor (sensitive zone, button, etc.).

Map anchor (this request is optional): with this request, the editor is asked to display one part of one page of a document containing the corresponding sensitive zone. This is useful only if the node is not visible in its entirety.

Objects that can be modified are managed by a number of requests for manipulating objects within a document. The HS 10 supports four mechanisms that make it possible to refer to objects in a document: 1) Identify modifiable object: if the editor runs permanent identifiers for its objects, these identifiers can be used to refer to objects in the request messages. Other editors can supply non-permanent identifiers in response to requests for object identifiers; 2) Name: if the editor manages some names for its objects, it is then referred to a modifiable object with a given name. If such an object is not found, an error message must be sent. If several objects have the name and type given, the result depends on the editor and must be documented; 3) Position: objects can be tagged by giving them a position in the document. The first object having this position is used. If there is no such object, an error message is sent; 4) Anchor: makes it possible to refer to the object containing this anchor. This object should be the sensitive type (sensitive zone, button, etc.).

Create modifiable objects (this request is supported optionally; if it is not supported, an error message must be sent): if possible, the editor must create an object with default properties and send the identifier of the object created to the system HS using a response message; if not, it sends an error message to the HS 10.

Insert (this request is optional): the editor is asked to insert the contents of a "clipboard" at a given position.

Delete/cut/copy (these requests are optional): the object tagged is deleted, cut or copied.

Select object (this request is optional): the editor has to select or de-select the object tagged.

Set cursor (this request is optional): the editor has to place the insertion cursor so it appears on the object tagged.

Select all objects (this request is optional): the editor has to select all objects of a certain type in a defined area.

Select text (this request is optional): the editor has to select a text in a given zone.

Align objects (this request is optional): the editor has to align (justify) the objects selected.

Set properties of a modifiable object (this request is optional, but if it is not supported, an error message must be sent): the values of the properties of a modifiable object are managed by the editor. The HS 10 can send this request to find the value of one property of an object. If the object tagged is found in the document and if the property is authorized and used by the editor for that object, the editor sends the value of the property with a response message; if not, it sends an error message to the HS 10.

Set properties of modifiable object (this request is optional): the HS 10 can send this request to change the value of a property of a modifiable object. If the object tagged is found in the document and the type of property and its value are correct for that object, the editor sets the value of the property to the new value; if not, it sends an error message to the HS 10.

The following nine messages concern menu management requests. These requests make it possible for scripts to change the menu bar of the editor for each document; but they are all optional. A so-called level parameter authorizes changes in reader mode, author mode or both at once.

Add to menu: the editor has to add a pull-down menu to the bar menu. If the position parameter is different from zero, the menu is placed in the position given, shifting the existing menus if that is necessary; if not, it is placed to the right of the existing menus.

Add menu part: the editor has to add a menu item to an existing menu. If the position parameter is different than zero, the menu part is placed in that position; if not, it is placed below the existing menu parts. The name of a menu part can be used in scripts as the name of an event message;

Remove menu: the editor must remove an existing menu from the menu bar,

Remove item of menu; the editor must remove part of a menu from an existing menu.

Activate/deactivate a menu/item of a menu: the editor must make available/unavailable (shade gray) the menu or menu part tagged.

Check/uncheck (make small mark beside menu) item of menu: the editor has to check or uncheck the menu part tagged.

Add/remove accelerator: the editor has to add or remove an accelerator to the part of the menu tagged.

Restore menu bar: the editor has to replace the menu bar to its normal state.

Conceal/display menu bar: the editor has to conceal or display the menu bar.

Set a system property (this request is optional): this message is sent to all editors when a property of the system is changed. The resulting change must be distributed and reproduced in any document opened by the editors.

Messages (this request is optional): the HS 10 sends a request asking the editor to display a message. The HS 10 does not wait for a response to the message. The editor then has to display and remove the messages.

Execution commands (this request is optional; if it is not supported, an error message must be sent): this request, sent by the HS 10 to the editor, contains a chain to be processed as a series of commands. The contents of the chain and the way in which it is processed depend on the editor.

Process menu-type event (necessary only for editors which send menu-type event messages): the default behavior of the HS 10 for this type of message is to send back a corresponding request. The processing of this message depends on the editor.

Synchronize (all editors that conform to the CP 22 must manage this request): the editor sends an "empty" response; this authorizes synchronization between the HS 10 and the editor.

Get pointer position (this request is optional, but if it is not supported, an error message must be sent): when it receives this request, the editor has to respond by giving the current position of the pointer in relation to the window containing the tagged document. If the document is not displayed, the editor must send an error message.

Special effect (this request is optional): after this request is received, the next document opened should be displayed in the window used in the tagged document. An optional special effect should be used.

Lock/unlock editor (this request is optional): makes it possible to lock or unlock the editor. When the editor is locked, it has to wait for an unlock request before processing any user request.

Record (this request is optional): when the editor is in record mode, it has to send the HS 10 messages that describe each action by a user (moving an object, changing a property, etc.). This automatically generates a script which will reproduce the sequence of actions.

The response messages from the editors to the request messages of the HS 10 have been examined during the description of said request messages. But it should be noted that the response or error messages must necessarily be sent before any subsequent request is read.

Concerning the event messages, the anchors (associated with the sensitive zones) and the nodes (associated with the documents) can advantageously have scripts that can contain managers, which are little processing programs for different events that may occur. The editor thus has to send the event messages to the HS 10 so that the events are processed appropriately.

When an editor is in reader mode, any event message (related to the mouse or the insertion cursor, for example) involving a sensitive zone must be sent to the corresponding anchor.

In addition to all these event messages, the editor can send specific event messages reporting a change in the configuration, which must be processed by the script of the node each time that the window containing the node moves, changes size or moves into the foreground or background.

When an event message is sent, the node identifier sent is the one sent to the editor when the document was opened. The anchor identifier must be set at zero if the event message concerns the node; if not, it stays at the value given when the anchor was created; the message is consequently routed to the node in the first case or to the corresponding anchor in the latter case.

The menu messages are sent to the HTK 12 of the HS 10 when the user selects a menu part. In most cases, these messages are optional, but the transmission of such messages enables authors of applications to personalize and customize such applications.

To maintain consistency between the contents and the structure of the hypermedia node, some editor functions have to be executed only after receipt of the request message sent by the HS 10. This will always be true of closing a node. If the editor supports anchors, this will also be true of saving a node. For this type of function, the editor has to send a menu message to the HS 10. The default procedure of the HS 10 includes sending a corresponding request message. If, on the other hand, a manager is found for processing the menu message, then that manager is used, and the default procedure is not executed.

However, some menu messages require special processing on the part of the HS 10, because these messages have special structures. Other menu messages use the general message structure, which contains the name of the menu message. This name usually comes from the tag on the menu part.

No specific menu part of the HS 10 is obligatory if the editor does not have to manage anchors.

For these messages, the node identifier sent is the one transmitted to the editor when the document is opened. The anchor identifier has to be set at zero if the menu message concerns the node; if not, it stays at the value set when the anchor was created.

Unmap node display (optional message): when a menu part for deleting the node display is selected by the user, this message has to be sent by the editor.

Close node (optional message): when a menu part for closing a node is selected by the user, this message has to be sent by the editor. If the node can be closed, the HS 10 will then send a close node request to the editor.

Save node (optional message): when a menu part for saving a node is selected by the user, this message must be sent by the editor. If it is possible, the system HS will then send a save node request to the editor.

Delete node (optional message): when a menu part concerning deletion of a node is selected by the user, this message has to be sent by the editor. If it is possible, then the HS 10 will send a delete node request to the editor. The HS 10 will delete the directory containing the contents of the document.

Create anchor (obligatory message for editors supporting anchors): the editor is responsible for providing the user interface for creating anchors. When a new anchor must be created, the editor sends this message. In response to this message, the HS 10 creates (if it is possible) a new anchor and sends a create anchor request to the editor. On the other hand, if it fails, a create anchor request with an anchor identifier equal to zero is sent to the editor. Typically and advantageously, a sensitive zone is created in the following manner.

The user marks off an area of the document chosen as a sensitive zone, which can be, for example, a rectangular area on an image, a part of the text, etc.. The editor sends the HS 10 a menu message about the creation of an anchor. The HS 10 creates a new anchor and sends the editor a create anchor request message. If the anchor cannot be created, the anchor identifier is set at zero. If the editor receives a valid create anchor request message, it updates its contents to include the new anchor; if not, it executes the proper procedures.

The HS 10 can create anchors without the user acting directly, by sending a create anchor request. The editor responds to this message the same way it did in the preceding case when the user made the choice himself.

Delete anchor (obligatory message for editors supporting anchors): when a sensitive object has to be deleted, the editor has to send this message. If the anchor can be deleted, the HS 10 sends a delete anchor request to the editor. Typically and advantageously, an anchor is deleted in the following manner.

The user selects the sensitive zone to be deleted. The editor sends the HS 10 a delete anchor menu message. If it can be deleted, the HS 10 deletes the anchor and sends the editor a delete anchor request; if not, the deletion is ignored. When the editor receives the delete anchor request, it deletes the corresponding object in the document.

The HS 10 can delete some anchors without the user acting directly, by sending a delete anchor request. The editor responds to this message in the same way it did in the preceding case when the user made the choice himself.

Selections (obligatory message for editors supporting anchors): the editor has to provide the user with a mechanism to select a node or a sensitive object. The selection style depends on the editor. The editor then sends this type of message. To select a node, the anchor identifier has to be set at zero. Typically, this type of message is used to create links.

Script editing (obligatory message or editors supporting anchors): each active object is combined with a script in language MT. The editor can send this message in response to a user selection. The HS 10 then calls upon the script editor to edit the script for the object specified.

Display information on object (obligatory message for editors supporting anchors): the default procedure for this menu message is that the HTK 12 of the system HS displays a dialogue box on the screen for displaying and changing various properties of the object designated.

Specific menu messages from an editor (optional message): the editor can send menu messages for various specific menu parts from the editor by using this type of message in which the name parameter can be used in a script to define a menu message manager. If no manager is found, the default procedure in this type of message is that the system HS sends the editor a menu management request. The name parameters for this type of message must be given in the specific documentation of the editor.

Menu messages defined by user (optional message): the editors can support additional menus and menu parts defined by the menu requests described above. The editors have to send these menu messages defined by the user when one part of the menu is selected using this type of message, in which the name parameter is the name of the menu part, as defined for the add menu part request. The name can be used in scripts to define a manager of the menu message. If no manager is found, the default procedure in this type of message is to do nothing.

In addition, all editors that conform to the CP 22 have to send error messages when they receive a request awaiting a response that is not managed by the editor. The editors that support anchors must send an error message when a create anchor request fails. In the other cases, the error messages are optional. In the error messages, the "request" parameters indicate, when this is the case, the type of request which caused the error, and the "reason" parameter provides the reason for the error. Some examples of common errors are mentioned here: bad anchor, bad document, bad length, bad correspondence, bad object, bad property, bad request, bad value, object not used, etc..

On the other hand, as was stated previously, a large number of messages used by the CP 22 contain properties characterized by a property type and a value with a predefined structure. Some properties are described below in order to provide a better understanding of the context in which the invention was developed. Note that all these properties are optional, since the editor can ignore any request for setting a property and can answer with an error message in the case of a get property request. Some properties are predefined, and their value can be found or set simply. It is also possible to expand the number of properties. The extra properties can be managed by the CP 22. To do so, the type of property that has to be used in this case is greater than a predefined number (for example 127). The value for these properties is an expansion value which contains the type and the real value. Thus, a modifiable object can be given an additional property defined by its name (to which a whole value corresponds) and a number which will be the number just above the number of properties already in existence. The HS 10 then has to define an expansion function which can be called up in language MT and send a related request message, while the editor concerned will have to manage the request after potential verification of the type of data.

The predefined properties can be for the system, a node or an object (text, image, graphic, group, button, cursors and gradation of potentiometers for audio, animation and video, sensitive zone for text or image, target).

Changes in the value of the system properties are sent to all the editors already connected and to each editor when it connects. Their effect is either to change the behavior of the editor or to specify new default values for new objects. The different modifiable parameters of these properties are the following:

display (if verified) or do not display anchors;
default background color for new objects;
if verified, default background image for new objects;
center new objects on the mouse;
geometry of a window with a drawing tool;
geometry of a window for selecting fonts;
list of default fonts for the new objects;
default foreground color for new objects;
grid, if verified a grid is displayed in all documents;
detach (adjust) grid in all documents;
spacing of grid in all documents;
default removals (shifts) for new objects;
default author mode or reader mode;
default line spacing for new objects;
default line style for new objects;
screen locking, if verified the editor does not update screen;
geometry of window for message box;
geometry of window for color selector;
number of default sides for new polygons;
if verified, the format rule is displayed in all documents;
default page size for new documents;
default tab spacing for new objects;
default tab type for new objects;
default text alignment (justification) for new objects; and
units in inches or millimeters (defaults to millimeters).

The different modifiable parameters of the node properties are the following:

background color;
background image;
children (hypermedia, node relationships);
cursor;
foreground color;
node identifier;
changes not taken into account, if verified;
magnification;
name;
page scrolling;
parent (hypermedia);
position;
zone selected;
position of zone selected;
text selected;
position of text selected;
selection;
size;
type (hypermedia), if verified node; and
window identifier.

The different modifiable parameters of the properties for the texts are the following:

anchor identifier (hypermedia), zero default value or anchor identifier value if the object is active;
background color
background image;

baseline;
children (hypermedia), list of sensitive zones in text;
modifiable object;
list of fonts;
foreground color;
highlighting (super-brightness) of zone of text on screen when the cursor enters that zone;
text identifier;
removals (shifts);
layer;
name;
parent (hypermedia);
position;
scrolling;
single line;
size;
line spacing;
tab spacing;
tab type;
text;
text alignment (justification);
text overflow,
upper position;
type, if verified text;
coordinates of points in upper left and lower right of text on screen;
display object, if verified object is visible; and
automatic line return.

The different modifiable parameters of the properties for images are the following:
anchor identifier (hypermedia), default value zero or anchor identifier value if object is active;
background color;
background image;
children (hypermedia), list of sensitive zones on images;
name of file containing image;
foreground color;
highlighting (super-brightness) of an image zone on the screen when the cursor moves into that zone;
image identifier;
layer;
name;
parent (hypermedia);
position;
size;
type (hypermedia), if verified, image;
coordinates of points in upper left and lower right of image on screen; and
display of object, if verified, object is visible.

The different modifiable parameters of properties for graphics are the following:
anchor identifier (hypermedia), zero default value or anchor identifier value if object is active;
background color;
background image;
foreground color;
highlighting (super-brightness) of a graphics zone on the screen when the cursor enters that zone;
graphics identifier;
layer;
line style;
name;
parent (hypermedia);
position;
size;
type (hypermedia), if verified graphic (line, circle, "camembert" . . . );
coordinates of points in upper left and lower right of graphic on screen; and
display object, if verified object is visible.

The different parameters of the properties for the modifiable compositions of objects are the following:
anchor identifier (hypermedia), zero default value or anchor identifier value if object is active;
children (hypermedia);
group identifier;
layer;
name;
parent (hypermedia);
position;
size;
type (hypermedia), if verified, group; and
display object, if verified object is visible.

The different modifiable parameters of the properties for the buttons are the following:
anchor identifier (hypermedia), anchor identification value;
color of validation button;
display of validation button;
background color;
background image;
fill in button after validation;
fill in button after selection;
list of fonts;
foreground color;
highlighting (super-brightness) button on screen when the cursor enters that zone;
button identifier;
set of buttons;
display tag;
chain tag;
type of tag;
layer;
name;
parent (hypermedia);
position;
color selection;
default display;
size;
type (hypermedia), if verified push-button, audio button or control button;
coordinates of points on upper left and lower right of button on screen; and
display object, if verified button is visible.

The different modifiable parameters of the properties for the potentiometer cursors (sliders) are the following:
anchor identifier (hypermedia), anchor identifier value;

background color;
background image;
list of fonts;
foreground color;
highlighting (super-brightness) of cursor on screen when the cursor enters that zone;
cursor identifier;
layer;
maximum cursor position;
minimum cursor position;
name;
parent (hypermedia);
position;
display cursor command keys;
size;
cursor size;
type (hypermedia);
value;
coordinates of points on upper left and lower right of cursor on screen; and
display object, if verified cursor is visible.

The different modifiable parameters of the properties for the graduated templates (scales) are the following:
anchor identifier (hypermedia), anchor identifier value;
background color;
background image;
decimal commas;
list of fonts;
foreground color;
highlighting (super-brightness) of gradations on screen when the cursor enters that zone;
identifier of graduated template;
layer;
maximum position of graduated template;
minimum position of graduated template;
name;
parent (hypermedia);
position;
height of graduated template;
width of graduated template;
display of values for graduated template;
size;
cursor size;
chain of title;
type (hypermedia);
value of graduated template;
coordinates of points on upper left and lower right of gradations on screen; and
display object, if verified gradations are visible.

The different modifiable parameters of the properties for audio are the following:
anchor identifier (hypermedia), zero default value or anchor identifier value if object is active;
validation button color;
validation button display;
background color;
background image;
adjustment of bass;
children (hypermedia);
current sequence;
length, sequences in milliseconds;
name of audio file;
fill in after validation;
fill in after selection;
first sequence, shift of audio sequence in milliseconds;
list of fonts;
foreground color;
highlighting (super-brightness) on screen when the cursor enters that zone;
audio identifier;
display label;
string of label;
type of label;
last frame, end-of-frame shift in milliseconds;
layer;
looping, if verified, continual repetition;
name;
parent (hypermedia);
position;
color selection;
size;
stereo;
adjust tones;
adjust treble;
type (hypermedia);
coordinates of points in upper left and lower right on screen;
display object, if verified, object is visible; and
adjust audio volume.

The different modifiable parameters of the properties for the animation and video are the following:
anchor identifier (hypermedia), zero default value or anchor identifier value, if the object is active;
background color;
background image;
adjust brightness;
children (hypermedia), list of "targets,";
adjust contrast;
current frame;
duration in number of frames;
name of file containing animation;
first frame of video sequence;
foreground color;
adjust color shades (tints);
animation and video identifier,;
last frame in video sequence;
layer;
looping, if verified, continual repetition;
name;
parent (hypermedia);
position;
adjust color (saturation);
adjust contour clarity;
size;
type and video standard (PAL, CVBS, . . . );

adjust tones;

type (hypermedia), animation or video;

coordinates of points in upper left and lower right on screen;

display object, if verified, the object is visible, and adjust audio volume.

The different modifiable parameters of properties for the sensitive text zones are the following:

anchor identifier (hypermedia), value of anchor identifier;

highlighting (super-brightness), verified if sensitive zone of text blinks when pointer is selected;

identifier of sensitive area of text;

layer;

name;

parent (hypermedia), identifier of part of text in sensitive zone;

position, first and last positions of character in the text in the sensitive zone;

text contained in sensitive zone;

type (hypermedia), sensitive zone of text;

coordinates of points in upper left and lower right on screen; and display, verified if object is visible.

The different modifiable parameters of properties for the sensitive zones in the images are the following:

anchor identifier (hypermedia), value of anchor identifier;

highlighting (super-brightness), verified if sensitive zone of image blinks when pointer is selected;

identifier of sensitive zone of image;

layer;

name;

parent (hypermedia), image identifier;

size of sensitive zone in image;

type (hypermedia), sensitive zones of image;

coordinates of points in upper left and lower right on screen; and display object, if verified object is visible.

The different modifiable parameters of properties for the "targets" are the following:

anchor identifier (hypermedia), value of anchor identification;

first frame of target;

highlighting (super-brightness), verified if sensitive zone blinks when pointer selects it;

target identifier;

last frame of target;

layer;

name;

parent (hypermedia), animation identifier;

position of target in animation window;

target size;

type (hypermedia), sensitive zone;

coordinates of points in upper left and lower right on screen; and display object, if verified, the object is visible.

The use of the very high-level bidirectional protocol described above yields a multitude of advantages. In particular, it makes it possible to develop interactive multimedia applications by eliminating the programming difficulties connected with this type of development. Indeed, because of the very high level of the communications protocol, it is easy to design a multimedia user interface for another application or to create an independent application with information using text, graphics, animation, sound and video. Complex applications can be created in less time to integrate new editors into the hypermedia system or to add functions to an editor, and the whole system can work in a distributed environment. The hypermedia system is open, since the communications protocol authorizes document management by a large number of editors that are connected to one another and communicate within the hyperstructure set up. In addition, the protocol can itself be expanded with no difficulty.

A variety of modifications and variations of the present invention are possible in light of the above teachings. It is therefore to be understood that, within the scope of the appended claims, the present invention may be practiced otherwise than as specifically described hereinabove.

What is claimed is:

1. A very high-level, adaptable bidirectional protocol for communication between a hypermedia system and a plurality of editors communicating within a hyperstructure, said protocol including a plurality of messages including open node and close node request messages sent by said hypermedia system when an action is to be executed by at least one of said editors, response messages sent by at least one of said editors in response to said request messages, event messages sent by at least one of said editors to inform said hypermedia system that various events have occurred, menu messages sent by at least one of said editors to inform said hypermedia system that a user has selected a predefined message and error messages sent by at least one of said editors when an error appears, said plurality of messages allowing each of said editors to manipulate and manage contents of hypermedia objects called nodes, while said protocol is manipulated by the hypermedia objects and is accessible through a programming interface, said nodes containing structures with an editor name for use with corresponding documents, said editors offering support for the protocol including said open node request and said close node request, whereby new editors may be easily integrated into an existing hyperstructure.

2. The protocol according to claim 1, wherein said protocol is based on a TCP/IP-type transmission management protocol.

3. The protocol according to claim 1 or 2, wherein said request messages of said protocol include both a request and a connection number specific to said request, said request message specifying application context, editor name, editor function and number of connections supported by said editor, whereby a connection specified by said connection number is used for response and error messages corresponding to said request.

4. The protocol according to claim 3, wherein a sensitive zone in a node which corresponds to a multimedia document is created according to the following steps:

marking an area in a document that is selected as said sensitive zone;

sending said hypermedia system a menu message to create an anchor which is a hypermedia object representing said sensitive zone of said contents of said node;

creating said anchor and sending one of said editors a create anchor request message;

updating one of said editors to include said anchor that has been created.

5. The protocol according to claim 4, wherein said hypermedia system creates said anchor without direct user intervention by:

creating said anchor and sending one of said editors said create anchor request message; and updating one of said editors to include said anchor that has been created.

6. The protocol according to claim 3, wherein an anchor, which is a hypermedia object representing a sensitive zone of the contents of a node, is deleted according to the following steps:

selecting said sensitive zone to delete;

sending said hypermedia system a delete anchor menu message;

deleting said anchor and sending at least one of said editors a delete anchor request message; and deleting said hypermedia object from a document that corresponds to said anchor.

7. The protocol according to claim 6, wherein said hypermedia system deletes said anchor without direct user intervention by:

deleting said anchor and sending at least one of said editors a delete anchor request message; and deleting said hypermedia object from said document that corresponds to said anchor.

* * * * *